United States Patent Office 3,446,094
Patented May 27, 1969

3,446,094
TORQUE SPLIT-TYPE AUTOMATIC SPEED CHANGE DEVICE
Kazuhiko Ohno and Yoichi Mori, Yokohama, Japan, assignors to Nissan Jidosha Kabushiki, Kaisha, Yokohama, Japan
Filed Mar. 7, 1967, Ser. No. 621,346
Claims priority, application Japan, June 20, 1966, 41/39,614
Int. Cl. F16h 47/08
U.S. Cl. 74—688                                    7 Claims

ABSTRACT OF THE DISCLOSURE

A torque split-type automatic speed change device comprising a driving shaft, a planetary gear assembly, and two split transmission routes consistsing of a route including a hydraulic transmission means inserted between one end of the driving shaft and the planetary gear assembly and another route extending between the other end of the driving shaft and the planetary gear assembly, whereby powers transmitted through such split routes can be combined together by means of the planetary gear assembly to deliver an output power therefrom.

---

This invention relates to an automatic speed change device, more particularly to a torque split-type automatic speed change device wherein power is transmitted from a crankshaft of an engine to an output shaft of the automatic speed change device through two split routes consisting of a route including a hydraulic transmission means inserted between one end of the crankshaft and a planetary gear assembly and another route extending between the other end of the crankshaft and the planetary gear assembly, so that. the power transmitted through such split routes can be combined together by means of the planetary gear assembly to deliver desired output power to the output shaft. The hydraulic transmission means usable in the automatic speed change device of the invention includes both a fluid torque converter (to be simply referred to as a "torque converter" hereinafter) and a fluid coupling.

Conventional speed change devices of the kind, which have been used heretofore, include a hydraulic transmission means and a planetary gear assembly both disposed in tandem at one end of the crankshaft of an engine in alignment with the axial center line of the crankshaft. Thus, such conventional speed change device was very long in size. Moreover, due to such long size, the conventional speed change devices are not suitable for certain type vehicles.

Therefore, the principal object of the invention is to obviate the above difficulties of the conventional speed change device by providing a novel torque split-type automatic speed change device having two divided routes, i.e. a route through a hydraulic transmission means coupled with one end of the crankshaft and another route coupled with the other end of the crankshaft, and a planetary gear assembly disposed in parallel with the crankshaft and connected to both said divided two routes to combine torques delivered therethrough. By disposing the planetary gear assembly in parallel with the crankshaft, instead of in alignment therewith, the length of the speed change device of the invention is made considerably shorter than that of conventional devices of the kind.

Another object of the present invention is to provide an automatic speed change device suitable for various types of vehicles, such as different combinations of front-engine, rear-engine, front-drive, rear-drive, longitudinally disposed engine, laterally disposed engine, etc. What is meant by "longitudinally" and "laterally" are, more particularly, "in parallel with the longitudinal direction of the vehicles" and "at right angles to the longitudinal direction of the vehicles," respectively.

In automatic speed change devices, various hydraulic transmission devices have heretofore been utilized, however, it has been well known that the efficiency of hydraulic transmission devices is generally lower than that of conventional mechanical transmission means. Therefore, an object of the present invention is to improve the efficiency of conventional automatic speed change devices by providing a novel torque split-type automatic speed change device including a hydraulic and a mechanical transmission route to transmit the entire output power of an engine through said two transmission routes.

These and other objects and advantages of the present invention will be made apparent from the following description taken in conjunction with the accompanying drawings, in which.

Figure 1:
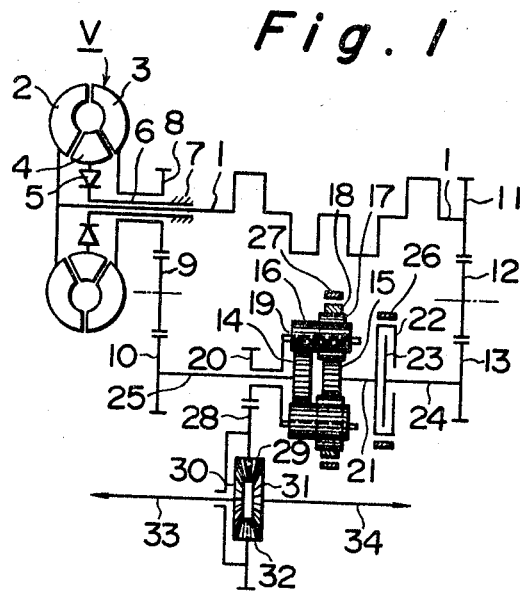
FIGS. 1 and 2 are simplified skeleton diagrams of first-type embodiments of the invention.
Figure 2:
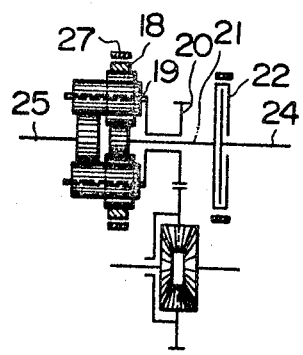
Figure 3:
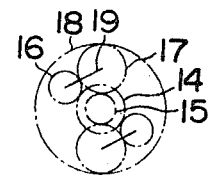
FIG. 3 is a diagrammatic illustration of the manner in which various gear elements of a planetary gear assembly, usable in the devices shown in FIGS. 1 and 2, are related each other.

Referring to FIGS. 1 to 3, illustrating skeletons of first type embodiments of a speed change device according to the invention, the axis of rotation of a pump 2 of a torque converter V is connected to one end of a crankshaft 1. The torque converter V comprises the pump 2, a turbine 3, a stator 4, and a one-way clutch 5. The outer portion of the one-way clutch 5 is secured to the stator 4, while the central portion thereof is connected to a stationary sleeve 6 secured to a casing 7 of the speed change device. The one-way clutch 5 is adapted to permit the stator 4 to rotate only in a normal direction, but not in a reverse direction opposite to said normal direction. What is meant by the "normal direction" is that direction in which the crankshaft 1 and the pump 2 are rotated.

Gears 8 to 10 are engaged in turn to constitute a transmission gear assembly, of which the gear 8 is secured to the turbine 3. The torque generated in the turbine 3 is transmitted to a first sun gear 14 of a planetary gear assembly to be described hereinafter through a route comprising the transmission gears 8, 9, 10 and a transmission shaft 25 extending from the transmission gear 10.

Furthermore, there are provided another series of transmission gears 11 to 13 for transmitting power from the other end of the crankshaft 1. The transmission gear 11 is secured to the crankshaft 1, and the power generated in the crankshaft 1 is transmitted to a second sun gear 15 of the planetary gear assembly through a route comprising the transmission gears 11, 12, 13, a transmission shaft 24 extending from the transmission gear 13, clutches 22, 23 to be described hereinafter, and another transmission shaft 21 extending from said clutch.

In addition to the first and second sun gears 14 and 15, the planetary gear assembly comprises first planet gears 16, second planet gears 17, an internal gear 18, and a carrier 19 to hold the first and second planet gears 16 and 17. Referring to FIG. 3, the pitch circles of the first sun gear 14 and the second sun gear 15 are engaged with those of the first planet gears 16 and the second planet gears 17 respectively, and each second planet gear 17 is engaged with each first planet gear 16 and at the same time with the internal gear 18. As described in the foregoing, the first sun gear 14 is connected to the aforementioned transmission shaft 25, while the second sun gear 15 is connected to the aforementioned transmission shaft 21. A clutch body 22 secured to the transmission shaft 21 and a clutch plate 23 secured to the transmission shaft 24 are adapted to cooperate each other for providing a selective connection between the transmission shafts 21 and 24. An output gear 20 is mounted on the carrier 19 as an integral part thereof so as to be rotated around the transmission shaft 25. Thereby, the output power on the output shaft 20 is transmitted to a differential gear means to be described hereinafter.

The differential gear means comprises parts represented by reference numerals 28 to 32. A gear 28 is driven by the output gear 20 secured to the planetary gear assembly, and bevel pinions 29 and 32 are carried by the gear 28 in such a manner that the axes of the bevel pinion are held at right angles to the axis of the gear 28. Side gears 30, 31 receive power from the bevel pinions 29, 32, and they are rotated separately from the gear 28 during the differential operation. Axles 33 and 34 are connected to side gears 30 and 31 respectively at inner ends thereof, and to a left side and a right side wheels (not shown) respectively at outer ends thereof, so that each side wheel can be driven by the output power delivered to the axle associated therewith.

With the aforementioned construction of the speed change device, a torque is always applied to the first sun gear 14 of the planetary gear assembly through the torque converter, and a torque can be selectively delivered to the second sun gear 15 of the planetary gear assembly from the crankshaft 1 through a clutch 22, 23. The two torques thus delivered are synthesized by the planetary gear assembly and transmitted to the differential gear means as an output power therefrom through the output gear 20 secured to the carrier 19 as an integral part thereof. Thus, both side wheels connected to the differential gear means are driven as described in the foregoing.

A first brake 26 acts to hold stationary the clutch body 22 and accordingly the second sun gear 15, while the second brake 27 acts to hold stationary the internal gear 18.

By automatically controlling those brakes 26, 27 and the aforementioned clutch means 22, 23 with a suitable fluid pressure mechanism (not shown), it is made possible to change speed in two forward stages and a rearward stage. The operation of the speed change device for each stage will now be described in further detail. Prior to entering into details, symbols representing revolving speeds (angular velocities) of each movable member of the planetary gear assembly, which are necessary for calculating the speed change ratio of the device, will be explained in conjunction with relations between revolving speeds of such movable members.

If the revolving speeds of the first sun gear 14, the second sun gear 15, the internal gear 18, and the carrier 19 are represented by $S_1$, $S_2$, $R$, and $C$, respectively, then there are following relations among such revolving speeds.

$$C(l_R - 1) = R l_R - S_1 \quad (\alpha)$$

$$C(l_S + 1) = R_2 l_S + S_1 \quad (\beta)$$

Here, $l_R$ and $l_S$ are per-unit values of the radii of pitch circles of the internal gear 18 and the second sun gear 15, respectively, based on the radius of the pitch circle of the first sun gear 14.

The behavior of the speed change device of FIGS. 1 to 3 for each operative stage thereof will now be described.

LOW SPEED STAGE

The brake 26 is actuated. Thus, the clutch body 22 is held stationary, and accordingly the second sun gear 15 secured to said clutch body is also kept still. In this case, the speed change ratio $m$ of the revolving speed of the carrier 19 and accordingly that of the output gear 20 affixed thereto with respect to that of the first sun gear 14 can be determined as follows by substituting $S_2=0$ to the Formula $\beta$.

$$m = S_1/C = l_S + 1$$

If the number of teeth of the transmission gear 8 is selected to be the same as that of the transmission gear 10, then the output gear 20 is rotated at a revolving speed slower than that of the turbine 3.

HIGH SPEED STAGE

The brake 26 is released and the clutch plate 23 is engaged with the clutch body 22. In this case, if the number of teeth of the transmission gear 11 and that of the transmission gear 13 are selected to be the same, then the second sun gear 15 is rotated at the same angular velocity as that of the crankshaft 1, and if it is further assumed that transmission gears 8 and 10 have the same number of teeth, then the first sun gear 14 is rotated at the same speed as that of the turbine 3 of the torque converter V. Thereby, the carrier 19 and the output gear 20 connected thereto are rotated at an intermediate angular speed between the revolving speed of the crankshaft 1 and that of the turbine 3.

Under those conditions, the input power to the first sun gear 14 is delivered from the crankshaft 1 through a route including the torque converter V, while the input power to the second sun gear 15 is delivered from the crankshaft 1 through a rigid mechanical route including the clutch 22, 23. Thus, the crankshaft power is delivered through the two split routes, and the overall mechanical efficiency thereof is made higher than that of a speed change device using only one transmission route including a torque converter, as described in the foregoing. When a vehicle equipped with the speed change device of FIG. 1 is run at a high speed, the torque converter V thereof is operated in a so-called coupled state, and the turbine 3 is revolved substantially at the same speed as that of the pump 2, which is the same as that of the crankshaft 1. The speed change ratio $m$ for this stage can be determined as follows by substituting $S_1 \doteqdot S_2$ in the Formula $\beta$.

$$m = S_1/C \doteqdot 1$$

REARWARD STAGE

The brake 27 is actuated. Then, the internal gear 18 is held stationary, and the carrier 19 is rotated together with the output gear 20 at a speed lower than that of the first sun gear 14 or the turbine 3. By substituting $R=0$ to the Formula α, the speed change ratio $m$ for this stage can be given by $$m = S_1/C = -(l_R - 1)$$

Operative conditions of various parts of the speed change device of FIGS. 1 to 3 in each speed change stage are summarized in Table I.

TABLE I

| Operative stage | Brake 26 | Clutch 22–23 | Brake 27 | Speed change ratio |
|---|---|---|---|---|
| Forward low speed. | Actuated | Disengaged | Released | $l_s + 1$ |
| Forward high speed. | Released | Engaged | do | 1 |
| Rearward | do | Disengaged | Actuated | $-(l_R - 1)$ |

In the speed change device of FIG. 1, the output gear 20 is mounted on the carrier 19 to the left of the planetary gear assembly or at that side which is close to the first sun gear, but it is also permissible to mount the output gear 20 to the right of the planetary gear assembly or at the side close to the second sun gear, as shown in FIG. 2. The speed change devices shown in FIGS. 1 and 2 have the same operative principles and both devices perform the same functions. Therefore, either device can be used selectively depending on particular construction and arrangement of a vehicle, on which such device is mounted. The first type embodiments of the speed change device according to the invention, as shown in FIGS. 1 and 2, can be mounted laterally on various vehicles, and they are particularly suitable for a front-engine front-drive type vehicle and a rear-engine rear-drive type vehicle.

Figure 4:
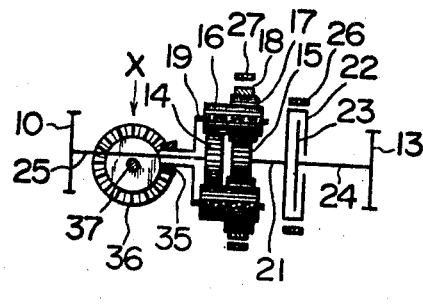
FIGS. 4 and 5 are skeleton diagrams of second type embodiments of the invention.
Figure 6:
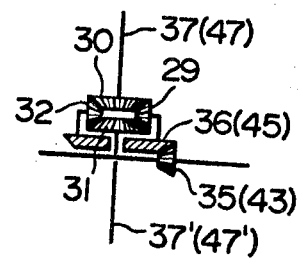
FIG. 6 is a diagrammatic illustration of a differential gear means usable in the device of FIGS. 4 and 5, taken from the direction shown by arrows X of FIGS. 4 and 5.
Figure 5:
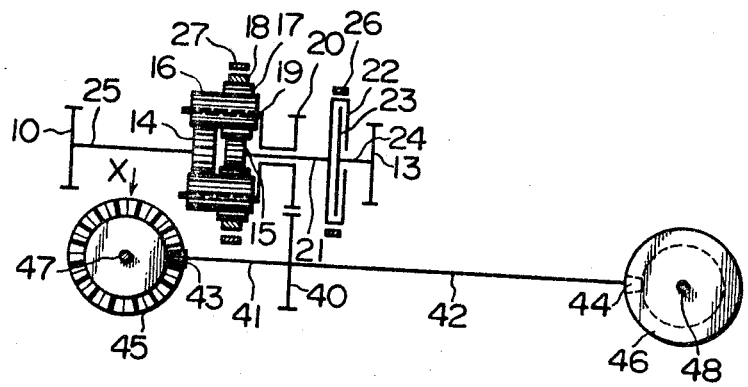

FIGS. 4 to 6 illustrate second type embodiments of the invention, suitable for use together with a longitudinally disposed engine. In the figures, only relations between a planetary gear assembly and an output shaft are shown, because the remainder of the second type embodiment, including a torque converter, a transmission gear for input power, a planetary gear assembly, clutches, brakes, etc. (represented by reference numerals 1 to 27), are the same as those of the preceding first type embodiment described hereinbefore referring to FIGS. 1 to 3. In FIG. 4, a hypoid gear assembly comprising a pinion 35 and a crown gear 36 is used in this embodiment as a reduction gear. An axle 37 is driven by the crown gear 36 through a differential gear assembly, as shown in FIG. 6. For simplicity, the differential gear assembly is not shown in FIG. 4. The differential gear assembly can be of any conventional type, for instance it comprises a pair of bevel pinion 29, 32 and a pair of side gears 30, 31.

The output power delivered to a carrier 19 is transmitted to the pinion 35 secured thereto as an integral part thereof, and further to the crown gear 36 disposed at right angles to the axis of the pinion for rotating the axles 37, 37′ at a reduced speed for driving both side wheels (not shown). This embodiment is suitable for a vehicle having an engine disposed longitudinally, which is front-engine front-drive type or rear-engine rear-drive type.

FIG. 5 illustrates a modification of the second type embodiments of FIG. 4, in which the output power is delivered to a transmission gear 40 meshed with an output gear 20 integral with a carrier 19 of the planetary gear assembly, and then to axles of a vehicle through a normal bevel gear or helical bevel gear assembly. In FIG. 5, both front and rear axles 47 and 48 are simultaneously driven for all wheel driving, but it is also permissible to drive either front or rear axle alone with the speed change device of the invention. In the illustrated embodiment, the output power is delivered from the transmission gear 40 to propeller shafts 41 and 42 to drive wheels, for instance driving front wheels by the propeller shaft 41 and rear wheels by a propeller shaft 42. Front and rear pinions 43 and 44 of reduction bevel gear assemblies are driven by propeller shafts 41 and 42, respectively, for transmitting power to crown gears 45 and 46. Each crown gear 45 or 46 is provided with a differential gear assembly, as shown in FIG. 6, in the same manner as the preceding embodiment described referring to FIG. 4. Axles 47, 47′, 48 and 48′ are driven by crown gears 45 and 46 through differential gear assemblies to rotate front and rear wheels (not shown).

This particular embodiment shown in FIG. 5 is suitable for a vehicle having an engine disposed longitudinally, which is front-engine front-drive type or rear-engine rear-drive type, as in the case of the preceding embodiment shown in FIG. 4. Furthermore, this embodiment can be also used with a vehicle of front-engine rear-drive type, rear-engine front-drive type, front-engine all wheel drive type, or rear-engine all wheel drive type. In addition, the propeller shafts 41 and 42 can be mounted at low positions, and accordingly, this embodiment has an advantage in substantially eliminating interference between the vehicle floor and the propeller shafts.

Figure 7:
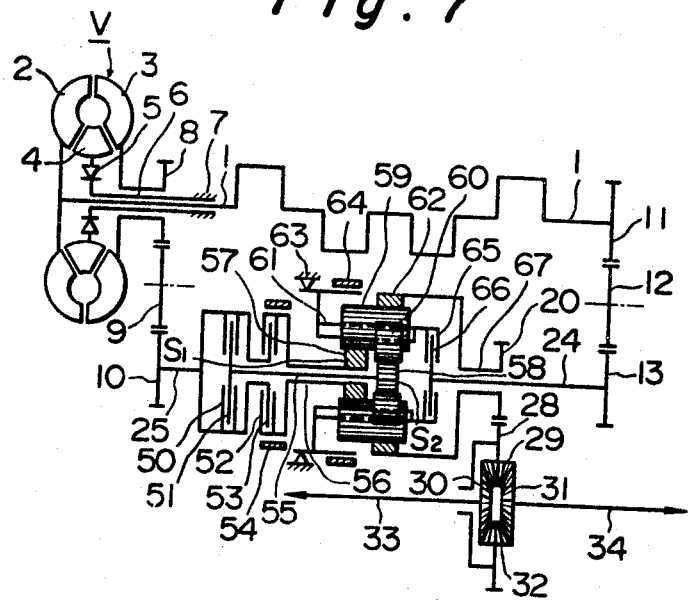
FIGS. 7 and 8 are skeleton diagrams of third type embodiments of the invention.
Figure 8:
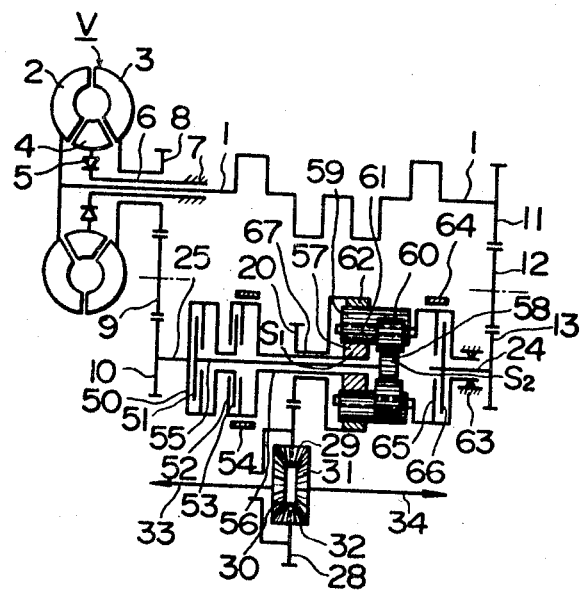
Figure 9:
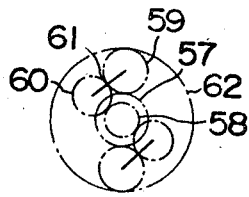
FIG. 9 is a diagrammatic illustration of the manner in which various gear elements of a planetary gear assembly, usable in the device of FIGS. 7 and 8, are related each other.

FIGS. 7 to 9 illustrate third type embodiments of the invention, provided with means for carrying out speed change in four forward stages and a rearward stage by using a suitable planetary gear assembly, such as a so-called Ravigneaux type planetary gear assembly.

In the embodiment shown in FIG. 7, the engine torque on a crankshaft 1 is transmitted through a torque converter V during the forward first, second, and rearward stages thereof. During the forward third stage, torque split-type transmission takes place by transmitting the power through two split routes comprising a route through the torque converter and a rigid mechanical route through a clutch. During the fourth forward stage, so-called over-drive takes place by transmitting the power only through the rigid mechanical route. What is meant by the word "over-drive" is a condition wherein an output gear 20 of the speed change device is rotated at a speed higher than that of an input shaft thereof, i.e. a crankshaft.

FIG. 8 illustrates a modification of the embodiment shown in FIG. 7, in which the position of an output gear 20 is changed. In other words, the output gear 20 is mounted to the right of the planetary gear assembly in the case of the embodiment of FIG. 7, while it is mounted to the left of the planetary gear assembly in the case of the embodiment of FIG. 8. The position of the output gear 20 can be determined so as to suit each particular construction and arrangement of a vehicle on which the speed change device is mounted.

FIG. 9 shows the manner in which elementary gears of the planetary gear assembly usable in the device of FIG. 7 or 8 are related to each other. For simplicity, each elementary gear is represented by its pitch circle in the figure.

In the embodiment shown in FIG. 7 or 8, a power transmission route from one end of a crankshaft 1 to a transmission gear 10 and another power transmission route from the opposite end of the crankshaft 1 to a transmission gear 13 are identical with the corresponding routes of the first and second type embodiments (see FIG. 1). In the figures, a power transmission route from the output gear 20 to axles 33, 34 through a differential gear means is also identical with the corresponding route of the first type embodiment. Accordingly, descriptions of those transmission routes will not be repeated hereinafter.

The torque delivered to the transmission gear 10 from a torque converter is transmitted to both a forward clutch 50 and a rearward clutch 53 through a transmission shaft 25. During the forward first, second, and third stages of operation, a forward clutch body 50 is engaged with a forward clutch plate 51 so as to transmit power to a second sun gear 58 through an intermediate shaft 55. In addition to the second sun gear 58, the planetary gear assembly comprises a first sun gear 57, first planet gears 59, second planet gears 60, a carrier 61 rotatably supporting the first and second planet gears 59, 60, and an internal gear 62. A one-way clutch 63 allows rotation of the carrier 61 in normal direction only and hampers the rotation thereof in the opposite direction. A first brake 64 is adapted to hold the carrier stationary during the forward first stage and rearward stage of operation. A direct connection clutch comprises a clutch body 65 and a cooperating clutch plate 66, and it is engaged during the forward third and fourth stages of operation for transmitting power from the crankshaft 1 to the carrier 61. A rearward clutch comprises a clutch body 52 and a clutch plate 53, and it is engaged during the rearward stage of operation for transmitting power from the torque converter V to the first sun gear 57. A second brake 54 is adapted to be actuated during the forward second and fourth stages of operation for holding the first sun gear 57 stationary. Power transmission routes for various speed change stages can be easily traced in a similar manner to the first type embodiment (FIG. 1) by those skilled in the art, and detailed descriptions thereof will not be repeated here. Table II illustrates conditions of each clutch and each brake during various operative stages together with speed change ratios therefor.

Figure 10:
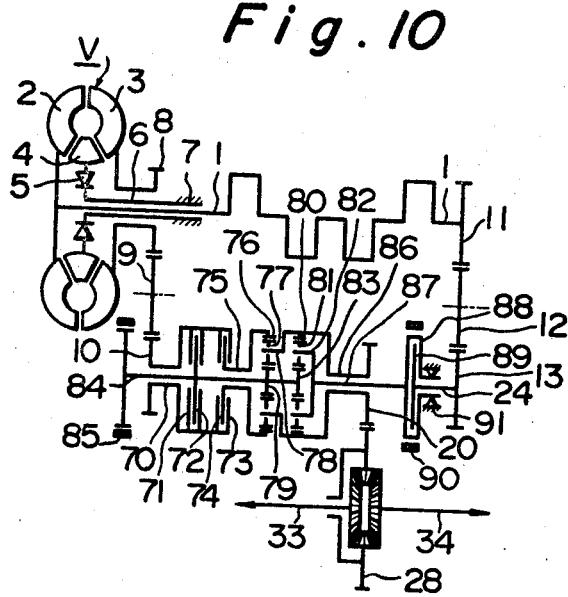
FIGS. 10 and 11 are skeleton diagrams of fourth-type embodiments of the invention.
Figure 11:
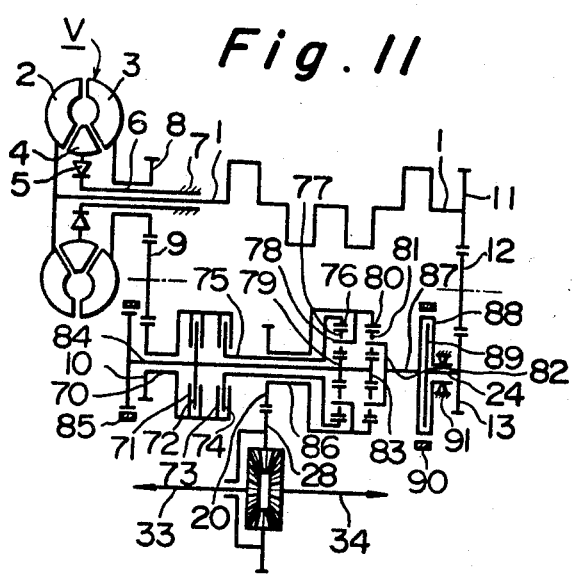

FIGS. 10 and 11 illustrate fourth embodiments, wherein a simple type planetary gear assembly is used. An output gear 20 is mounted to the right of the planetary gear assembly in the case of the device of FIG. 10, while it is mounted to the left of the planetary gear assembly in the case of the device of FIG. 11. The location of the output gear can be selected depending on the particular structure and arrangement of a vehicle on which such speed change device is mounted.

The fourth type embodiments are operated in four forward stages and a rearward stage, and the planetary gear assembly is driven by means of a torque converter V during the forward first, second, and rearward stages of operation, by means of the torque split type power transmission during the forward third stage of operation, and by means of rigid mechanical power transmission for overdrive during the forward fourth stage of operation, as in the case of the third type embodiments. In the fourth type embodiments, input power transmission routes from the crankshaft 1 to transmission gears 10 and 13 and an output power transmission route from an output gear 20 to axles 33, 34 through a differential gear assembly are the same as those of the first and third type embodiments, so that detailed description of such power transmission routes will not be repeated hereinafter.

TABLE II

| Operative stage | Forward first | Forward second | Forward third | Forward fourth | Rearward |
|---|---|---|---|---|---|
| Forward clutch (50, 51) | Engaged | Engaged | Engaged | Disengaged | Disengaged |
| Forward clutch (52, 53) | Disengaged | Disengaged | Disengaged | do | Engaged |
| Direct connection clutch (65, 66) | do | do | Engaged | Engaged | Disengaged |
| First brake (64) | Actuated | Released | Released | Released | Actuated |
| Second brake (54) | Released | Actuated | do | Actuated | Released |
| One-way clutch (63) | Engaged | Disengaged | Disengaged | Disengaged | Disengaged |
| Speed change ratio | R/S | $l_R(1+l_S)/l_S(1+l_R)$ | 1 | $l_R/(1+l_R)$ | $-l_R$ |

Notes (1) In Table II, $l_R$ and $l_S$ are per-unit values of the pitch circle radii of the internal gear 62 and the second sun gear 58 respectively, based on the pitch circle radius of the first sun gear 57.

(2) There are following relations between the revolving speeds of the first sun gear 57, the second gun gear 58, the internal gear 62 and the carrier 61, which are represented by $S_1$, $S_2$, R, and C respectively.

$$C(l_R+1) = S_1 + Rl_R$$
$$C(l_S+1) = S_1 + S_2 l_S$$

The speed change ratios of Table II are determined by substituting zero to the revolving speed of each member, which is held stationary during each particular stage of operation, in the aforementioned formulae.

(3) The reason why the condition of the first brake during the forward first stage is parenthesized in Table II is as follows. During the normal operation of the speed change device in the forward first stage, various resistive forces acting on the carrier 61 from the outside tend to rotate the same in the non-normal direction, however such tendency can be effectively hampered by the one-way clutch 63 without necessitating the actuation of the first brake 64, and the carrier is held stationary. On the other hand, if engine brake is applied, for instance during downward movement along a slope, the carrier 61 tends to be rotated in the normal direction, and the one-way clutch 63 is not capable of hampering such tendency. Therefore, the first brake 64 is actuated when engine brake is applied in order to prevent the carrier from rotating in the normal direction.

This embodiment is suitable for a vehicle having an engine disposed laterally, which is front-engine front-drive type or rear-engine rear-drive type.

In FIGS. 10 and 11, a rearward clutch comprises a clutch body 71 and a clutch plate 72, while a forward clutch comprises a clutch body 73 and a clutch plate 74. A planetary gear assembly comprises a first internal gear 76, first planet gears 77, a first carrier 78 carrying the first planet gears 77, a first sun gear 79, a second internal gear 80, second planet gears 81, a second carrier 82 carrying the second planet gears 81, and a second sun gear 83. The first and second sun gears 79, 83 are secured to a shaft 84 being connected with the clutch plate 72 and engageable with a second brake 85. The first internal gear 76 is connected to the clutch plate 74 of the forward clutch through a tubular shaft 75. Both the first carrier 78 and the second internal gear 80 are secured to the output gear 20 as an integral part thereof. The second carrier 82 is connected to a clutch body 88 of a direct connection clutch comprising said body 88 and a cooperating clutch plate 89. The clutch body 88 is engageable with a first brake 90 and a one-way clutch 91 mounted on the casing 7. The one-way clutch 91 allows rotation of the direct connection clutch body 88 and the second carrier 82 in the normal direction, while it hampers rotation thereof in the opposite direction. The direct connection clutch plate 89 is bonded to the transmission gear 13 through a shaft 24, and the power from the crankshaft 1 is delivered to the direct connection clutch plate 89 through a rigid mechanical route.

Power transmission routes for each speed change stage of the fourth type embodiments can be easily traced by those skilled in the art in a manner similar to the first type embodiments (see FIG. 1). Accordingly, detailed description of such power transmission routes will not be repeated hereinafter. Table III illustrates operative conditions of the clutches and brakes during each stage of the operation of the speed change device together with speed change ratios therefor.

the remaining lower half thereof located below the axial center line is not shown.

TABLE III

| Operative stage | Forward first | Forward second | Forward third | Forward fourth | Rearward |
|---|---|---|---|---|---|
| Forward clutch (73, 74) | Engaged | Engaged | Engaged | Disengaged | Disengaged. |
| Rearward clutch (71, 72) | Disengaged | Disengaged | Disengaged | do | Engaged. |
| Direct connection clutch (88, 89) | do | do | Engaged | Engaged | Disengaged. |
| First brake (90) | Actuated | Released | Released | Released | Actuated. |
| Second brake (85) | Released | Actuated | Released | Actuated | Released. |
| One-way clutch (91) | Engaged | Disengaged | Disengaged | Disengaged | Disengaged. |
| Speed change ratio (m) | 2+1/l | 1+1/l | 1 | l/(l+1) | −1. |

Notes (1) If it is assumed that $l_1$ and $l_2$ represent a per-unit value of the pitch circle radius of the first internal gear 76 based on the pitch circle radius of the first sun gear 79 and a per-unit value of the pitch circle radius of the second internal gear 80 based on the pitch circle radius of the second sun gear 83, respectively, then there are following relations between the revolving speeds of the first sun gear 79, the first internal gear 76, the first carrier 78, the second sun gear 83, the second internal gear 80, and the second carrier 82, which are represented by $S_1$, $R_1$, $C_1$, $S_2$, $R_2$ and $C_2$, respectively.

$$C_1(1+l_1)=S_1+l_1R_1$$
$$C_2(1+l_2)=S_2+l_2R_2$$
$$C_1=R_2$$
$$S_1=S_2$$

If it is assumed that $l_1=l_2=l$ for simplicity of calculation, then one obtains the following relations.

$$C_1(1+l)=S_1+lR_1 \quad (\alpha')$$
$$C_2(1+l)=S_2+lR_2 \quad (\beta')$$

The speed change ratios of Table III are determined by substituting zero to the revolving speed of each member, which is held stationary during each particular stage of operation, in the aforementioned Formulae $\alpha'$ and $\beta'$.

(2) The relations between the first brake 90 and the one-way clutch 91 during the forward first stage, as shown in Table III, are the same as those of the third type embodiment (Table II).

The fourth type embodiment of the present invention is suitable for a vehicle having an engine disposed laterally, which is front-engine front-drive type or rear-engine rear-drive type.

Figure 12:
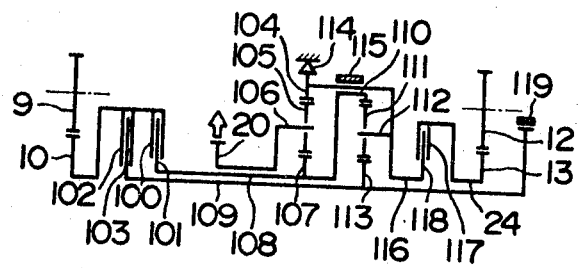
FIG. 12 is a skeleton diagram of a fifth type embodiment.
Figure 13:
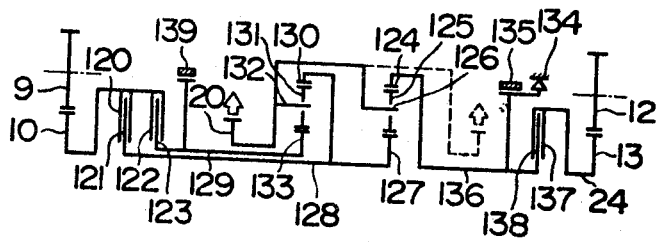
FIG. 13 is a skeleton diagram of a sixth type embodiment.
Figure 14:
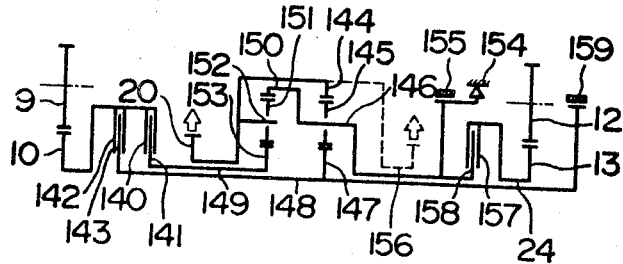
FIG. 14 is a skeleton diagram of a seventh type embodiment of the invention.

FIGS. 12, 13 and 14 illustrate a fifth, a sixth, and a seventh type embodiments of the present invention, respectively, in which a simple planetary gear assembly is used, as in the case of the fourth type embodiment described hereinbefore referring to FIGS. 10 and 11. In the fifth to seventh type embodiments, an input crankshaft 1, a torque converter V, an output side differential gear means, and axles are not shown, because such members are identical with the corresponding members of the preceding embodiments. Accordingly, what is shown in FIGS. 12 to 14 is only a portion of each embodiment, which is located between an input means comprising transmission gears 9, 10, 12, 13 associated with both ends of the crankshaft 1 and an output gear 20 of the speed change device. What is included in said portion of the speed change device is a planetary gear assembly, clutches, brakes, and mechanical connections between them. For simplicity of the drawings, only the upper half of each speed change device located above the axial center line of the planetary gear assembly is shown, while The fifth type embodiment will now be described referring to FIG. 12. A forward clutch comprises a clutch body 100 and a clutch plate 101, while a rearward clutch comprises a clutch body 102 and a clutch plate 103. A first planetary gear assembly comprises a first internal gear 104, first planetary gears 105, a first carrier 106, and a first sun gear 107, while a second planetary gear assembly comprises a second internal gear 110, second planet gears 111, a second carrier 112, and a second sun gear 113. The first internal gear 104 is bonded to the second carrier 112, and then connected to a tubular shaft 116, which is in turn secured to a clutch plate 118 of a direct connection clutch. A direct connection clutch body 117 cooperating with the clutch body 118 is bonded to the transmission gear 13. Thus, power of the crankshaft 1 can be transmitted to the planetary gear assemblies through the direct connection clutch 117, 118. The first internal gear 104 is also engageable with a one-way clutch 114 and a first brake 115. The output gear 20 is secured to the first carrier 106. The first sun gear 107 is bonded to the second internal gear 110, and then connected to a tubular shaft 108 having the clutch plate 101 secured thereto. The second sun gear 113 is connected to a shaft 109 having the clutch plate 103 of the rearward clutch secured thereto, and the shaft 109 is engageable with a second brake 119 so as to control the movement of the sun gear 113 and the clutch plate 103.

The routes for power transmission for each speed change stage of the fifth type embodiment can be determined in the same manner as the first type embodiment (FIG. 1), and hence the detailed description thereof will not be repeated hereinafter. The conditions of each clutch and brake in each speed change stage are shown in Table IV.

TABLE IV

| Operative stage | Forward first | Forward second | Forward third | Forward fourth | Rearward |
|---|---|---|---|---|---|
| Forward clutch (100, 101) | Engaged | Engaged | Engaged | Disengaged | Disengaged. |
| Rearward clutch (102, 103) | Disengaged | Disengaged | Disengaged | do | Engaged. |
| Direct connection clutch (117, 118) | do | do | Engaged | Engaged | Disengaged. |
| First brake (115) | Actuated | Released | Released | Released | Disengaged. |
| Second brake (119) | Released | Actuated | Released | Actuated | Actuated. |
| One-way clutch (114) | Engaged | Disengaged | Disengaged | do | Released. |
| Speed change ratio (m) | 1+1 | (l+1)²/(l²+l+1) | 1 | l(l+1)/(l²+l+1) | −l(l+1). |

Note (1) The speed change ratios of Table IV are determined in the same manner as those of the fourth type embodiment described hereinbefore referring to Table III.

(2) The relations between the first brake 115 and the one-way clutch 114 during the forward first stage of the operation, as shown in Table IV, are the same as those of the third type embodiment (Table II).

The sixth type embodiment will now be described referring to FIG. 13. This type embodiment has a structure identical with that of the fifth type embodiment (FIG. 12) except for modifications in interconnections between movable members of planetary gear assemblies. Since such modifications are apparent to those skilled in the art from comparison of FIGS. 12 and 13, no detailed description of the structure will be made hereinafter. Routes for power transmission in the device of FIG. 13 can be easily traced in the same manner as described hereinbefore referring to the first type embodiment (FIG. 1), and detailed descriptions of such transmission routes will not be repeated here, except the following modifications on the preceding fifth embodiments. Namely, in FIG. 13, a first internal gear 130 and a second sun gear 127 are connected together and associated with a torque converter through a forward clutch comprising a clutch body 120 and a clutch plate 121, and first and second carriers 132 and 126 are bonded together and connected to an output means 20. A first sun gear 133 is associated with the torque converter through a rearward clutch comprising a clutch body 122 and a clutch plate 123 while as shown by dotted lines in the figure. The location of the output gear can be determined so as to suit the particular structure and arrangement of a vehicle on which the speed change device of the invention is mounted. In Table VI, the manner in which the speed change ratios are determined and the relations between a first brake 155 and a one-way clutch 154 during the forward first stage of operation are the same as the corresponding manners and relations in Tables IV and V.

TABLE VI

| Operative stage | Forward first | Forward second | Forward third | Forward fourth | Rearward |
|---|---|---|---|---|---|
| Forward clutch (140, 141) | Engaged | Engaged | Engaged | Disengaged | Disengaged. |
| Rearward clutch (142, 143) | Disengaged | Disengaged | Disengaged | do | Engaged. |
| Direct connection clutch (157, 158) | do | do | Engaged | Engaged | Disengaged. |
| First brake (155) | Actuated | Released | Released | Released | Actuated. |
| Second brake (159) | Released | Actuated | do | Actuated | Released. |
| One-way clutch (154) | Engaged | Disengaged | Disengaged | Disengaged | Disengaged. |
| Speed change ratio (m) | l+1 | (2l+1)/(l+1) | 1 | 1/(l+1) | −1. | being engageable with a second brake 139, and a second internal gear 124 is associated with a second route through a direct connection clutch comprising a clutch body 137 and a clutch plate 138 while being engageable with a first brake 135.

The conditions of each clutch and each brake are shown in Table V for each operative stage together with speed change ratios therefor. In this sixth type embodiment, it is permissible to mount the output gear either to the left of the planet gear assembly, as shown by dotted lines in the figure. The location of the output gear 20 can be determined so as to suit particular structure and arrangement of a vehicle on which the speed change device is to be mounted.

The fifth, sixth, and seventh type embodiment are suitable for a vehicle having an engine disposed laterally, which is front-engine front-drive type or rear-engine rear-drive type, as in the case of the fourth embodiment (FIGS. 10 and 11).

In each of the embodiments of the invention described in the foregoing, a torque converter is used as a hydraulic power transmission means to be mounted at one end of the crankshaft 1. However, if it is not required to transmit a large torque at low speed operation, then such torque converter can be replaced with a fluid coupling. The power transmission route from one end of the crankshaft 1 of the planetary gear assembly through the hydraulic power transmission means and the other power

TABLE V

| Operative stage | Forward first | Forward second | Forward third | Forward fourth | Rearward |
|---|---|---|---|---|---|
| Forward clutch (120, 121) | Engaged | Engaged | Engaged | Disengaged | Disengaged. |
| Rearward clutch (122, 123) | Disengaged | Disengaged | Disengaged | do | Engaged. |
| Direct connection clutch (137, 138) | do | do | Engaged | Engaged | Disengaged. |
| First brake (135) | Actuated | Released | Released | Released | Actuated. |
| Second brake (139) | Released | Actuated | do | Actuated | Released. |
| One way clutch (134) | Engaged | Disengaged | Disengaged | Disengaged | Disengaged. |
| Speed change ratio (m) | l+1 | (l+1)/l | 1 | (l²−1)/l² | −(l²−1). |

In Table V, the manner in which the speed change ratios are determined and the relations between the first brake 135 and the one-way clutch 134 during the forward first stage are the same as those of Table IV.

The seventh type embodiment of the present invention will now be described referring to FIG. 14. Except for interconnections between movable members of planetary gear assemblies, the structure of the seventh type embodiment is identical with that of the fifth type embodiment (FIG. 12), and hence detailed description of the structure will not be made hereinafter. The procedure for determining routes for power transmission in each speed change stage is identical with that of the first type embodiment (FIG. 1), and accordingly no detailed description thereof will be made hereinafter, except the following modifications on the preceding fifth embodiment. Namely, a first internal gear 150 and a second carrier 146 are bonded together and associated with a second route through a direct connection clutch comprising a clutch body 157 and a clutch plate 158 while being engageable with a first brake 155, and a first carrier 152 and a second internal gear 144 are bonded together and connected to an output means 20. A first sun gear 153 is associated with a torque converter through a rearward clutch comprising a clutch body 140 and a clutch plate 141, and a second sun gear 147 is associated with the torque converter through a forward clutch comprising a clutch body 142 and a clutch plate 143 while being engageable with a second brake 159.

Table VI shows conditions of each clutch and brake during each operative stage, together with the speed change ratios therefor. In this embodiment, it is also permissible to mount the output gear 20 either to the left of the planetary gear assemblies, as illustrated by solid lines in FIG. 14, or to the right of the planetary gear assemblies, transmission route from the opposite end of the crankshaft 1 to the planetary gear assembly are formed by the transmission gears 8, 9, 10 and the similar transmission gears 11, 12, 13 respectively, in the case of the preceding embodiments. However, such transmission gears for the transmission routes can be replaced with suitable chains or belts.

Figure 15:
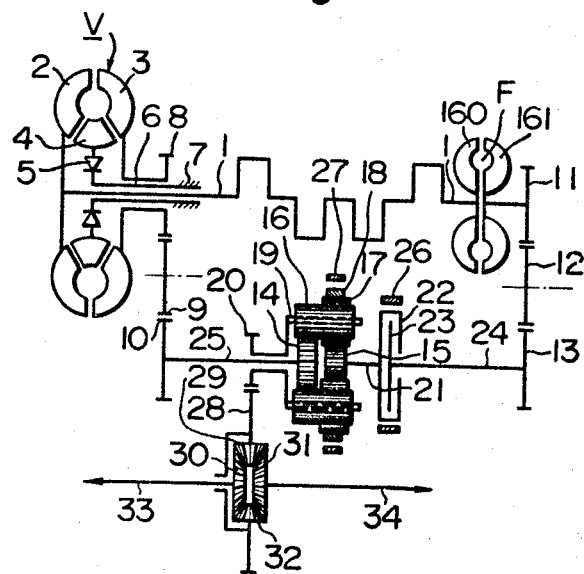
FIG. 15 is a skeleton diagram of an eighth embodiment, which is essentially the same as that of FIG. 1 except that a fluid coupling is used in one of the split transmission routes.

Furthermore, in the preceding embodiments, a direct connection clutch is inserted in said the other power transmission route from said opposite end of the crankshaft to the planetary gear assembly, and at the moment when such direct connection clutch is engaged, there is a possibility of producing a rapid variation in the revolving speed of the output gear 20. Mechanical shocks due to such rapid speed variation of the output gear 20 can be prevented by inserting a fluid coupling F in the aforementioned other transmission route, as shown in FIG. 15. Such fluid coupling can be used with any one of the preceding embodiments, and the application of such fluid coupling will now be described by taking an example of mounting it on the first type embodiment.

FIG. 15 is a skeleton diagram of a modification of the speed change device of the first type embodiment (FIG. 1) by providing a fluid coupling F located between one end of a crankshaft 1 and a rigid mechanical power transmission route including a direct connection clutch 22, 23. In the device of FIG. 15, the fluid coupling comprises a pump 160 and a turbine 161. During low speed operation, the clutch 22, 23 is disengaged, and a brake 26 is actuated to hold the clutch body 22 stationary. In this case, the turbine 161 is rotated at the same speed as the crankshaft 1, but there is no torque transmitted through the fluid coupling F.

During high speed operation, the brake 26 is released, and the clutch 22, 23 is engaged. At the moment of the engagement of the clutch 22, 23 upon release of the brake 26, the clutch body 22 which has been kept stationary acts to slow down the revolving speeds of various machine elements between the clutch plate 23 and the turbine 161. Under these conditions, if there should be no fluid coupling, the revolving speed of the crankshaft 1 tends to be slowed down, but due to the large inertia of the crankshaft 1, a considerably large shock is exerted on the output gear 20. On the other hand, if there is provided a fluid coupling F inserted in the power transmission route, as illustrated in FIG. 15, the quick variation of the revolving speed of the crankshaft 1 can be absorbed by slip of the fluid coupling F, and the magnitude of that inertia which affects the mechanical shock on the output gear 20 is restricted to a small value, namely to a small inertia including those of the clutch plate 23, the turbine 161, and minor accessories associated therewith. The fluid coupling F transfers only small portion of the output power from the crankshaft 1 to the second sun gear 15, and hence, the fluid coupling can be comparatively small.

The fluid coupling F can be inserted between the clutch plate 23 and a transmission gear 13, or at an intermediate point of the shaft 24. If the fluid coupling is mounted on the shaft 24, the inertia of transmission gears 11, 12, 13 are eliminated from the overall inertia affecting the mechanical shock acting on the output gear 20, and only inertia contributing to the shock on the output gear 20 is that of the turbine 161, and the magnitude of such shock is considerably reduced. In addition, it is also permissible to eliminate the clutch 22, 23 by replacing it with a fluid coupling F, so that the transmission and interruption of power can be effected by controlling the flow of operating fluid to the fluid coupling.

As described in the foregoing, according to the present invention, there is provided a torque split-type automatic speed change device having two split power transmission routes consisting of a route formed by connecting a hydraulic transmission means at one end of a crankshaft of an engine acting as an input shaft to the speed change device and another route issuing from the opposite end of the crankshaft, and both said power transmission routes are connected to a planetary gear assembly so as to produce a final output power out of the planetary gear assembly. The invention has been described by taking several different forms of the planetary gear assembly, but the present invention is not restricted only to such forms of planetary gear assembly, but planetary gear assemblies of any suitable form can be used in the device of the invention. Whichever type planetary gear assembly may be used, it is disposed in parallel with the crankshaft of an engine. As a result of it, both the engine and the speed change device can be made short and compact. In other words, the space taken by such engine and speed change device in a vehicle can be reduced so as to make more space available for passenger seats and other utilities.

What we claim is:

1. An automatic speed change device having split routes of power transmission, comprising the crankshaft of an automobile engine, a planetary gear assembly, a first power transmission route including a hydraulic torque converter and extending between one end of said crankshaft and said planetary gear assembly, a second power transmission route including a direct connection clutch and extending between the other end of said crankshaft and said planetary gear assembly, an output means driven by said planetary gear assembly so as to produce a composite power of two powers delivered thereto through said first and second routes, a first brake engageable with said direct connection clutch, and a second brake, said planetary gear assembly having a first sun gear operatively connected with said torque converter, a second sun gear operatively connected with said direct connection clutch, an internal gear engageable with said second brake, first planet gears meshed with said first sun gear, second planet gears meshed with both said second sun gear and said internal gear, each said first planet gear being meshed with one of said second planet gears, a carrier adapted to pivotally hold said first and second planet gears and connected with said output means.

2. An automatic speed change device having split routes of power transmission, comprising the crankshaft of an automobile engine, a planetary gear assembly, a first power transmission route including a hydraulic torque converter and extending between one end of said crankshaft and said planetary gear assembly, a second power transmission route including a direct connection clutch and extending between the other end of said crankshaft and said planetary gear assembly, an output means driven by said planetary gear assembly so as to produce a composite power of two powers delivered thereto through said first and second routes, and a first and a second brake, said planetary gear assembly having a first sun gear operatively connected with said torque converter through a second clutch and engageable with said second brake, a second sun gear operatively connected with said torque converter through a first clutch, an internal gear connected with said output means, first planet gears meshed with both said first sun gear and said internal gear, second planet gears meshed with said second sun gear, each said second planet gear being meshed with one of said first planet gears, a carrier pivotally supporting said first and second planet gears and operatively connected with said second route through said direct connection clutch and engageable with said first brake, and a one-way brake being engaged while releasing all said brakes for driving said output means at a first stage speed in a first direction, said first clutch being engaged while actuating only said second brake for driving said output means at a second stage speed in said first direction, said first and direct connection clutches being engaged for driving said output means at a third stage speed in said first direction, said direct connection clutch being engaged while actuating only said second brake for driving said output means at a fourth stage speed in said first direction, and said second clutch being engaged while actuating said first brake for driving said output means in a second direction reverse to said first direction.

3. An automobile speed change device having split routes of power transmission, comprising the crankshaft of an automobile engine, a planetary gear assembly, a first power transmission route including a hydraulic torque converter and extending between one end of said crankshaft and said planetary gear assembly, a second power transmission route including a direct connection clutch and extending between the other end of said crankshaft and said planetary gear assembly, an output means driven by said planetary gear assembly so as to produce a composite power of two powers delivered thereto through said first and second routes, and a first and a second brake, wherein said planetary gear assembly has a first internal gear operatively connected with said torque converter through a second clutch, first planet gears meshed with said first internal gear, a first carrier pivotally supporting said first planet gears and connected with said output means extending toward said second route, a first sun gear meshed with said first planet gears, a second internal gear bonded to said first carrier, second planet gears meshed with said second internal gear, a second sun gear meshed with said second planet gears and bonded to said first sun gear, and a second carrier pivotally supporting said second planet gears, said first and second sun gears being operatively connected with said torque converter through a first clutch and engageable with said second brake, said second carrier being operatively connected with said second route through said direct connection clutch and engageable with said first brake.

4. An automatic speed change device according to claim 3 wherein said output means extends toward said torque converter.

5. An automatic speed change device having split routes of power transmission, comprising the crankshaft of an automobile engine, a planetary gear assembly, a first power transmission route including a hydraulic torque converter and extending between one end of said crankshaft and said planetary gear assembly, a second power transmission route including a direct connection clutch and extending between the other end of said crankshaft and said planetary gear assembly, an output means driven by said planetary gear assembly so as to produce a composite power of two powers delivered thereto through said first and second routes, and a first and a second brake, said planetary gear assembly having a first internal gear, first planet gears meshed with said first internal gear, a first carrier pivotally supporting said first planet gears, a first sun gear meshed with said first planet gears, a second internal gear, second planet gears meshed with said second internal gear, a second sun gear meshed with said second planet gears, and a second carrier pivotally supporting said second planet gears, said first internal gear and said second carrier bonded together and operatively connected with said second route through said direct connection clutch while being engageable with said first brake, said first carrier is connected with said output means, said first sun gear and said second internal gear bonded together and operatively connected with said torque converter through a second clutch, said second sun gear operatively connected with said torque converter through a first clutch while being engageable with said second brake.

6. An automatic speed change device having split routes of power transmission, comprising the crankshaft of an automobile engine, a planetary gear assembly, a first power transmission route including a hydraulic torque converter and extending between one end of said crankshaft and said planetary gear assembly, a second power transmission route including a direct connection clutch and extending between the other end of said crankshaft and said planetary gear assembly, an output means driven by said planetary gear assembly so as to produce a composite power of two powers delivered thereto through said first and second routes, and a first and a second brake, said planetary gear assembly having a first internal gear, first planet gears meshed with said internal gear, a first carrier pivotally supporting said first planet gears, a first sun gear meshed with said first planet gears, a second internal gear, second planet gears meshed with said second internal gear, a second sun gear meshed with said second planet gears, and a second carrier pivotally supporting said second planet gears, said first internal gear and said second sun gear bonded together and operatively connected with said torque converter through a first clutch, said first and second carriers bonded together and connected with said output means, said first sun gear operatively connected with said torque converter through a second clutch while being engageable with said second brake, said second internal gear operatively connected with said second route through said direct connection clutch while being engageable with said first brake.

7. An automatic speed change device having split routes of power transmission, comprising the crankshaft of an automobile engine, a planetary gear assembly, a first power transmission route including a hydraulic torque converter and extending between one end of said crankshaft and said planetary gear assembly, a second power transmission route including a direct connection clutch and extending between the other end of said crankshaft and said planetary gear assembly, an output means driven by said planetary gear assembly so as to produce a composite power of two powers delivered thereto through said first and second routes, and a first and a second brake, said planetary gear assembly having a first internal gear, first planet gears meshed with said first internal gear, a first carrier pivotally supporting said first planet gears, a first sun gear meshed with said first planet gears, a second internal gear, second planet gears meshed with said second internal gear, a second sun gear meshed with said second planet gears, and a second carrier pivotally supporting said second planet gears, said first internal gear and said second carrier bonded together and operatively connected with said second route through said direct connection clutch while being engageable with said first brake, said first carrier and said second internal gear bonded together and connected with said output means, said first sun gear operatively connected with said torque converter through a second clutch, said second sun gear operatively connected with said torque converter through a first clutch while being engageable with said second brake.

References Cited

UNITED STATES PATENTS

| | | | |
|---|---|---|---|
| 643,130 | 2/1900 | Heermans | 74—695 |
| 1,125,140 | 1/1915 | Lucke | 74—701 X |
| 2,725,762 | 12/1955 | Hettinger et al. | 74—688 |
| 2,919,604 | 1/1960 | De Lorean | 74—688 X |
| 3,025,721 | 3/1962 | De Lorean | 74—688 |
| 3,029,662 | 4/1962 | Hause | 74—688 X |
| 3,209,617 | 10/1965 | Kalversberg | 74—688 |
| 3,246,542 | 4/1966 | Moan | 74—688 X |
| 3,270,585 | 9/1966 | Livezey | 74—688 X |
| 3,300,001 | 1/1967 | Stockton | 74—763 X |
| 3,314,307 | 4/1967 | Egbert | 74—688 |

DONLEY J. STOCKING, *Primary Examiner.*

THOMAS C. PERRY, *Assistant Examiner.*

U.S. Cl. X.R.

74—664, 695, 701